United States Patent
Ruffa et al.

(10) Patent No.: US 8,284,072 B1
(45) Date of Patent: Oct. 9, 2012

(54) TSUNAMI DETECTION SYSTEM

(75) Inventors: Anthony A. Ruffa, Hope Valley, RI (US); Richard A. Erwin, Portsmouth, RI (US); Fletcher A. Blackmon, Forestdale, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 311 days.

(21) Appl. No.: 12/728,451

(22) Filed: Mar. 22, 2010

(51) Int. Cl.
*G08B 21/00* (2006.01)
*G02B 6/00* (2006.01)

(52) U.S. Cl. .............. 340/690; 385/12; 702/14

(58) Field of Classification Search ......... 340/690, 340/686.1; 73/170.29; 398/177; 702/167, 702/14; 385/12
See application file for complete search history.

(56) References Cited

U.S. PATENT DOCUMENTS

| | | | |
|---|---|---|---|
| 6,449,400 B1 * | 9/2002 | Watanabe et al. ............ 385/12 |
| 7,693,663 B2 * | 4/2010 | Friedlander et al. ......... 702/15 |
| 7,702,502 B2 * | 4/2010 | Ricci et al. ............... 704/205 |
| 7,994,912 B2 * | 8/2011 | Inomata et al. ............ 340/552 |
| 8,072,595 B1 * | 12/2011 | Bastiaans et al. .......... 356/301 |
| 2007/0171400 A1 * | 7/2007 | Payton ..................... 356/73.1 |
| 2008/0013161 A1 * | 1/2008 | Tokura et al. .............. 359/334 |
| 2010/0008730 A1 * | 1/2010 | Valdy ...................... 405/169 |
| 2010/0158431 A1 * | 6/2010 | Huffman et al. ............. 385/12 |

\* cited by examiner

*Primary Examiner* — Benjamin C Lee
*Assistant Examiner* — Sigmund Tang
(74) *Attorney, Agent, or Firm* — James M. Kasischke; Jean-Paul A. Nasser; Michael P. Stanley

(57) ABSTRACT

The invention as disclosed is a system for real time detection of tsunami waves. A tsunami is considered a "shallow water wave", having a large wavelength compared to the ocean depth. A tsunami can have wavelengths ranging from 100 to 500 km, and amplitudes up to 60 cm (i.e., a pressure signal of up to 1 psi). At least one telecommunications grade optical fiber cable fitted with repeaters spanning the length of an ocean, a laser and a signal processor are used to measure pressure signals over spatial cells as small as 0.5 meters in width based on Rayleigh scattering effects and employing optical time delay reflectometry. The tsunami pressure signals are extracted from the pressure signals generated by wind-generated water waves (having much shorter wavelengths) through signal processing to distinguish between the substantial differences in wavelength, period and propagation speed.

3 Claims, 5 Drawing Sheets

TSUNAMI DETECTION SYSTEM

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention is directed to tsunami detection. In particular, the present invention is directed to a system that can reduce the amount of time it takes to detect a tsunami by an order of magnitude by using an underwater fiber optic cable as a pressure sensor.

(2) Description of the Prior Art

Although tsunami waves contain tremendous energy, their distributed nature (e.g., very long periods and wavelengths) make detection difficult. A satellite radar detection of the tsunami wave created by the 2004 Indian Ocean earthquake was made hours after the tsunami wave originated and occurred far too late to provide any practical warning of the event. Detection of tsunami waves ideally need to occur in real time.

The Deep Ocean Assessment and Reporting of Tsunamis (DART), a system patented by the National Oceanic and Atmospheric Administration, attempts to detect tsunami waves via point measurements of pressure changes due to surface waves. However, given the long tsunami wavelengths, the DART point measurements will have a greater false alarm rate than a distributed measurement.

Currently, there is a need for a tsunami detection system that can detect very long wavelengths in ocean waves in real time and without a high false alarm rate.

SUMMARY OF THE INVENTION

It is a general purpose and object of the present invention to provide a tsunami detection system that can detect very long wavelengths in ocean waves in real time and can distinguish shallow water waves from wind generated waves having much smaller wavelengths.

The above object is accomplished with the present invention through the use of at least one fiber optic cable sensor spanning the length of an ocean. A tsunami is considered a "shallow water wave", having a large wavelength compared to the ocean depth. A tsunami can have wavelengths ranging from 100 to 500 km, and amplitudes up to 60 cm (i.e., a pressure signal of up to 1 psi). A telecommunications grade optical fiber cable fitted with repeaters, can measure pressure signals over spatial cells as small as 0.5 m using Rayleigh scattering effects and optical time delay reflectometry. The tsunami pressure signals are extracted from the pressure signals generated by wind-generated water waves through signal processing to distinguish between the substantial differences in wavelength, period and propagation speed.

BRIEF DESCRIPTION OF THE DRAWINGS

A more complete understanding of the invention and many of the attendant advantages thereto will be more readily appreciated by referring to the following detailed description when considered in conjunction with the accompanying drawings, wherein like reference numerals refer to like parts and wherein.

DETAILED DESCRIPTION OF THE INVENTION

Figure 1:
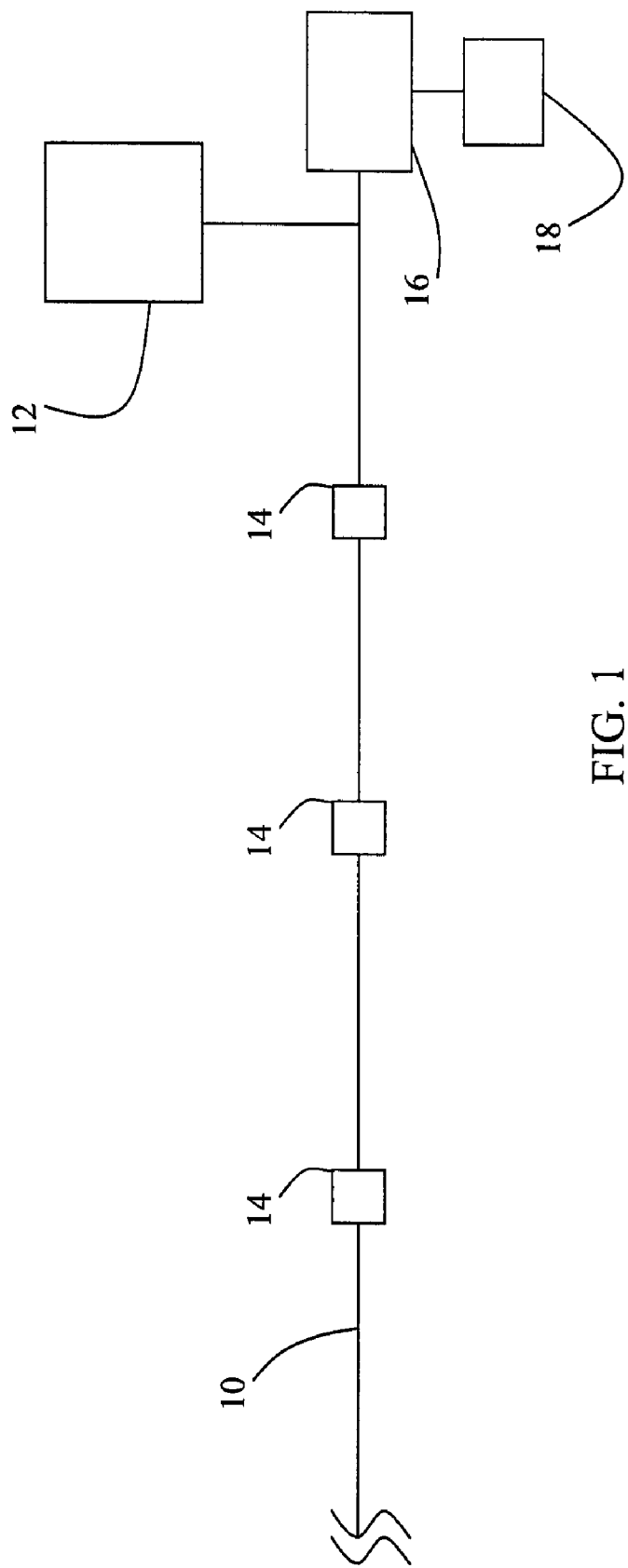
FIG. 1 illustrates the components of the system of the present invention.

Referring to FIG. 1, there is illustrated the components of the tsunami wave detection system of the present invention. A telecommunications grade optical fiber cable 10 is spanned across an ocean for use as a pressure sensor. In alternate embodiments more then one optical fiber cable 10 is employed. In a preferred embodiment, the length of the cable 10 is at least 1000 kilometers in length. A laser 12 is connected to the optical fiber cable to generate an optical signal across the optical fiber cable 10. Optical repeaters 14 are integrated into the cable 10 at predetermined distances to overcome losses in the optical signal due to attenuation by the optical fiber. The optical fiber cable 10 is connected to a digital signal processor 16 that will perform optical time delay reflectometry on the optical signal based on the Rayleigh scattering effect. In a preferred embodiment, the digital signal processor 16 is a programmable computer data processing system. State of the art optical time delay reflectometry can support strain measurements averaged over one meter lengths along an optical fiber cable of a 25 mile span without repeaters. Suitable optical repeaters 14 can extend this length indefinitely. The optical time delay reflectometry will break up the scattering into time of arrival bins of every meter of length on the optical fiber cable 10. The time of arrival bins are then used to sense the strain in the optical fiber cable 10 due to the pressure of the waves. The digital signal processor 16 is connected to a communication system 18 that can transmit an alert upon the detection of a tsunami wave. In one embodiment, the communication system 18 can comprise a wired telecommunication system. In an alternate embodiment, the communication system 18 is a wireless radio frequency transceiver system. The entire tsunami wave detection system is activated whenever seismographic readings indicate an earthquake has occurred in or near the ocean.

Figure 2:
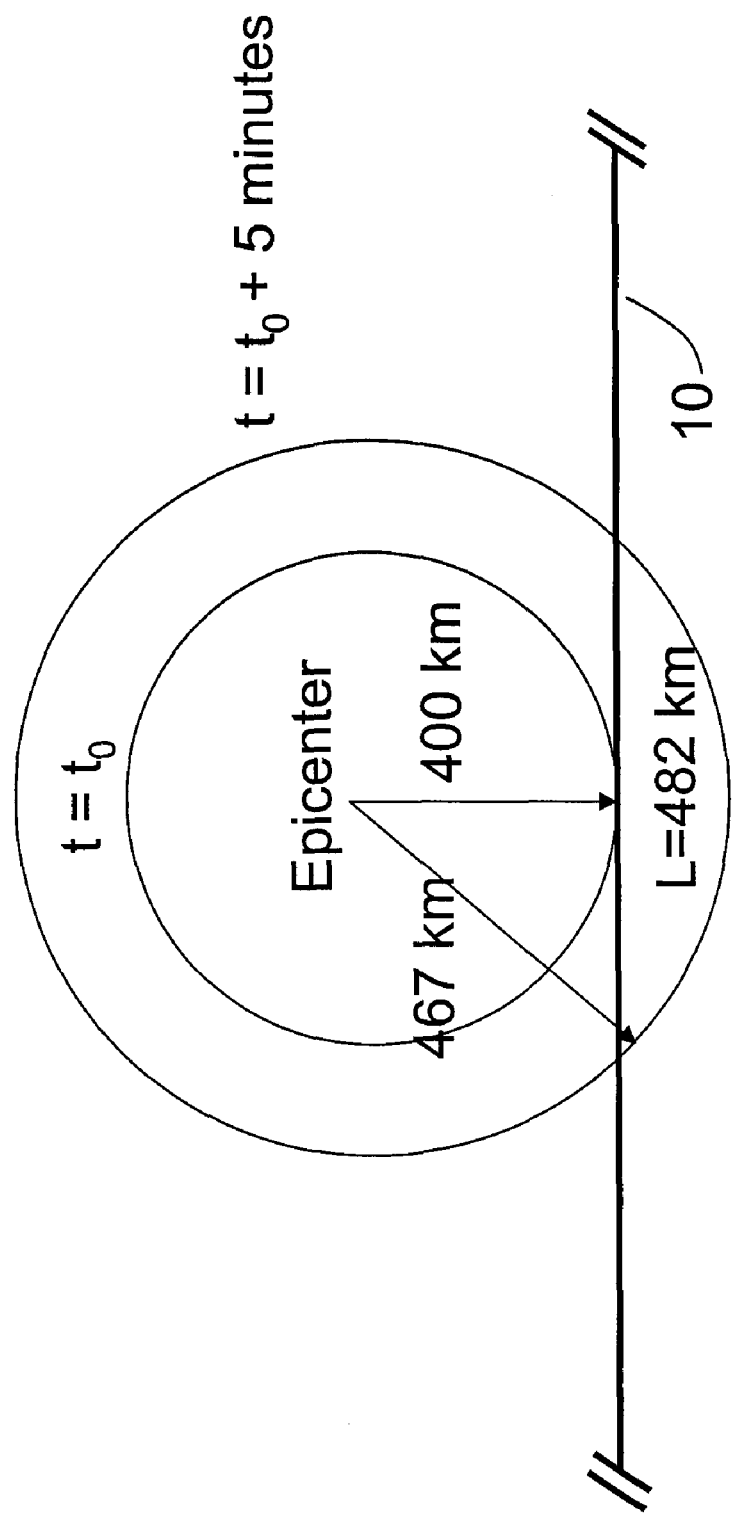
FIG. 2 illustrates a tsunami wave originating at an epicenter that is 400 kilometers away from the optical fiber cable of the system of the present invention.

The tsunami wave detection system detects ocean waves with wavelengths ranging from 100-500 km and amplitudes of up to 60 cm, which translates to a pressure signal of up to 1 psi. Referring to FIG. 2 there is illustrated a tsunami wave whose epicenter originates 400 kilometers from the optical fiber cable 10 at time $t=t_0$. The tsunami wave will have a propagation speed of $v=\sqrt{gd}$ where g is the gravitational acceleration, and d is the water depth. The tsunami wave will have a travel time of $t=2D/\sqrt{gH}$, where H is the shelf break depth and D is the distance to shore. At time $t=t_0+5$ minutes, the tsunami wave front has crossed the optical fiber cable 10 across a length of 482 kilometers. The use of optical time delay reflectometry will generate four hundred eighty two thousand distributed measurements of pressure (signals) in 1-meter bins across the 482 kilometers of optical fiber cable 10. In addition to the tsunami wave, wind generated waves will also be detected by the tsunami wave detection system. Signal processing methods are used to separate the two types of waves in spectral space to eliminate the wind generated waves from consideration and thereby avoid false positives.

In the preferred embodiment of the tsunami wave detection system, tsunami waves and wind generated waves are distinguished by their respective wave-number k, wherein k=$2\pi/\lambda$. A typical tsunami wave-number is on the order of one thousandth that of wind wave wave-numbers. For example a spatial fast Fourier transform (FFT) performed on measurements obtained from a 1000 kilometer optical fiber cable such as the one illustrated in FIG. 2 (with individual samples averaged over 10-m length scales) would generate 100,000 wave-number bins. Most of the tsunami wave energy would be confined to wave-number bins 10 or lower, while wind wave energy would reside in the region around bin 10,000. Due to the large spectral separation in wave-numbers of tsunami and wind waves, a low pass filter is used to suppress the wind wave energy. For example, a standard Butterworth filter with a stop band slope of −20 dB/decade (starting at bin 10) reduces the wind wave energy by 60 dB, boosting the estimated signal to noise ratio after signal processing to 50 db. Continuous calculation of spatial FFT's allows detection of a tsunami wave in minimum time.

Figure 3:
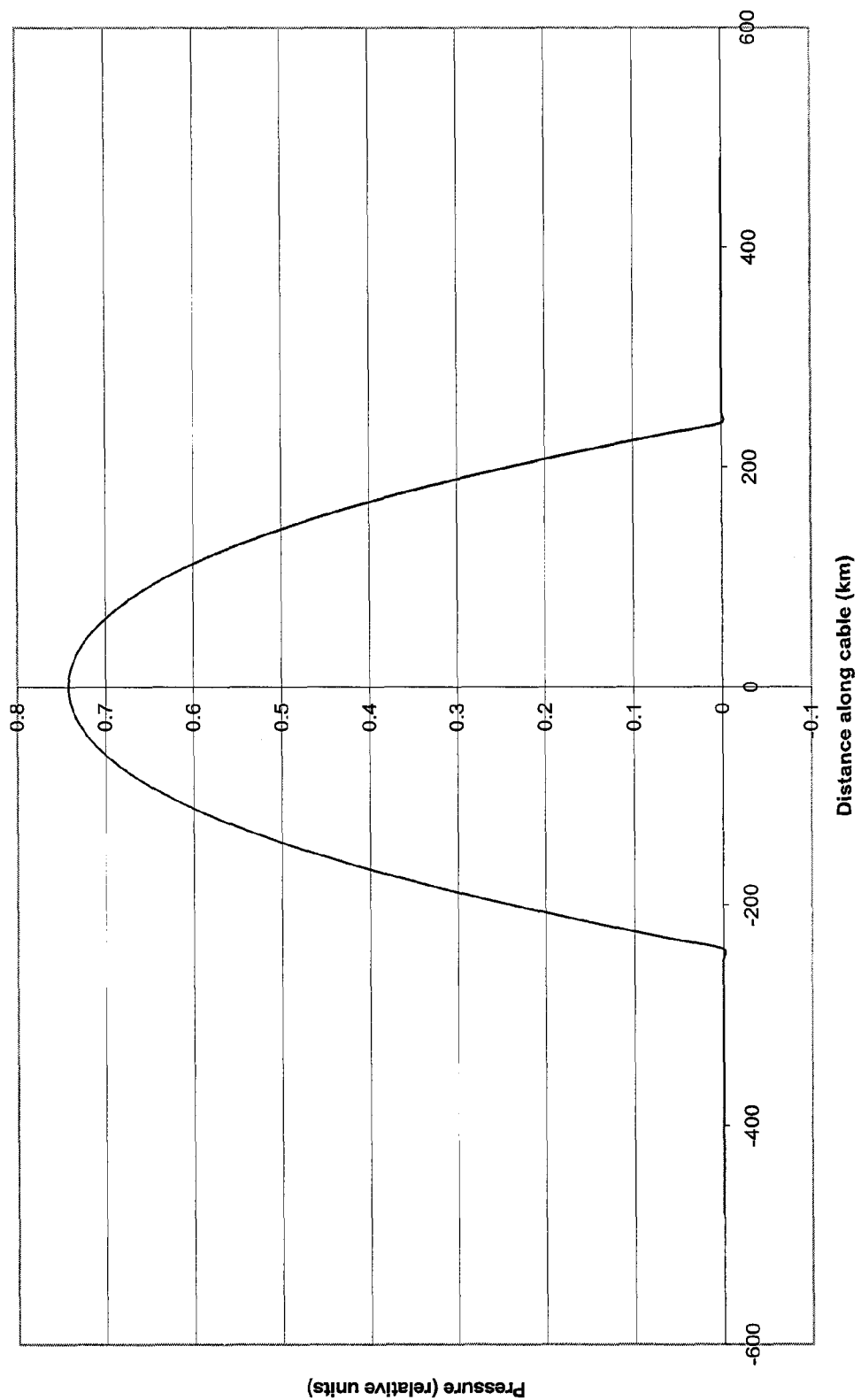
FIG. 3 illustrates the graphical measurement of the pressure of a tsunami wave across the optical fiber cable.

Detection and classification of a tsunami wave cannot occur until a sufficient part of the tsunami wave presents itself over the optical fiber cable 10. Referring again to FIG. 2, at time t=$t_0$+5 minutes, the tsunami wave front has crossed the optical fiber cable 10 across a length of 482 kilometers. The hydrodynamic pressure would have an extent of 482 kilometers across the cable 10 as illustrated in the graph of FIG. 3. The Fourier series decomposition takes the following form:

$$F(n) = \frac{1}{L}\int_{-\sqrt{R^2+d^2}}^{\sqrt{R^2+d^2}} \cos k\sqrt{R^2+x^2}\cos(n\pi x/L)dx.$$

In the above equation, L is the length of the cable 10 (e.g. 1000 km), R is the distance to the epicenter (400 km), d is the distance traveled in five minutes (67 km), k (=$2\pi/\lambda$) is the wave-number, and $\lambda$ is the wavelength (500 km). The Fourier series components of the hydrodynamic signature are converted to decibels, as illustrated in the bar graph of FIG. 4. This conversion represents a very close approximation to the FFT terms. Even with artifacts, time of t=$t_0$+5 minutes presents enough spectral energy in wave-number bins 0-10 to allow the detection of a tsunami wave with a high level of confidence.

Figure 4:
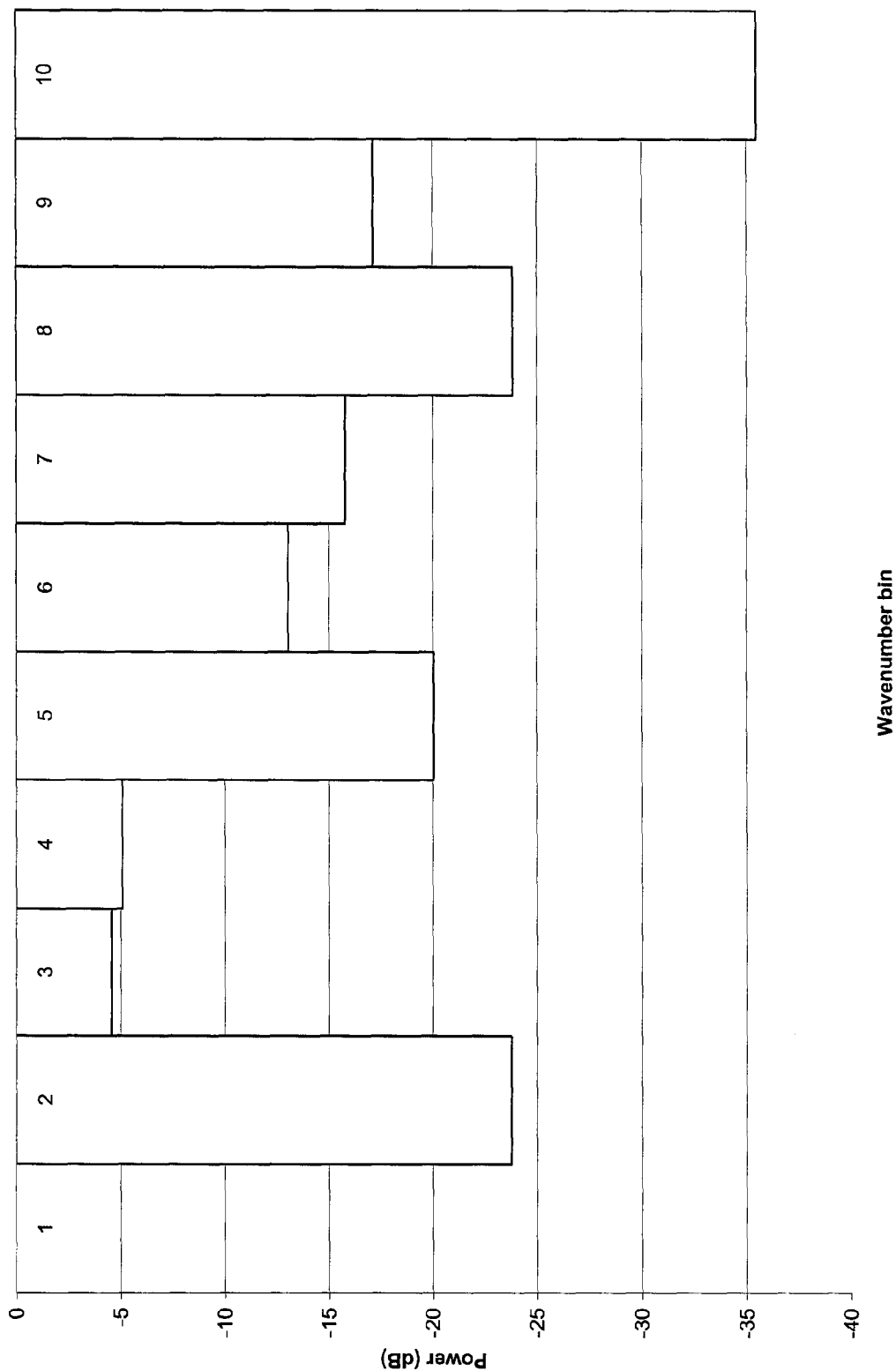
FIG. 4 illustrates a bar graph of the wave number bins for a tsunami wave.
Figure 5:
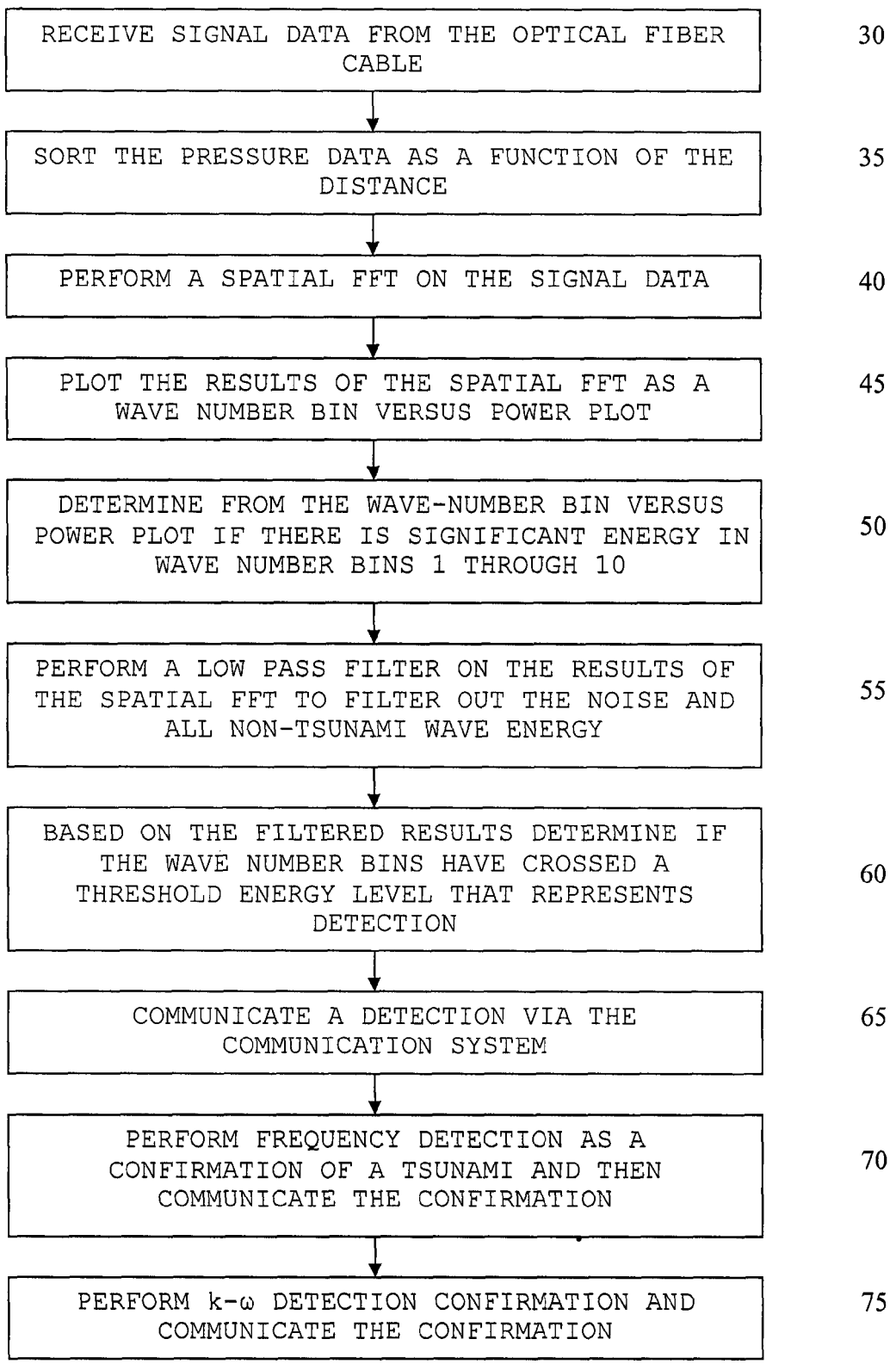
FIG. 5 illustrates a flow chart of the operation of the system of the present invention.

The steps of the preferred embodiment of the method of the present invention, using the apparatus as described above, are illustrated in the flow chart of FIG. 5. The first step 30 is to collect signal data from the optical fiber cable. The signal data represents pressure from water waves and is measured using optical time delay reflectometry. The second step 35 is to sort the pressure data as a function of the distance in one meter increments (for example). The third step 40 is to perform a spatial FFT on the signal data. The fourth step 45 is to plot the results of the spatial FFT on the signal data as a wave number bin versus power graph as illustrated in FIG. 4. The fifth step 50 is to analyze the wave-number bin versus power plot to determine if there is significant energy in bins 1 through 10. Significant energy in the bins 10 or below is a strong indication of a tsunami wave. The sixth step 55 is to perform a low pass filter on the results of the spatial FFT to filter out the noise and all non-tsunami wave energy. The seventh step 60 is to analyze the filtered results and determine if the wave number bins have crossed a threshold energy level that represents detection. The eighth step 65 is to then communicate the detection via the communication system 18.

In an alternative embodiment, additional analysis of the tsunami wave form is performed as supplemental confirmation of detection comprising additional steps to the method described above. A ninth step 70 of additional analyses comprises the step of performing frequency detection as a confirmation of a tsunami and then communicating the confirmation. Wind generated water waves have periods ranging from 5 to 20 seconds, while tsunami wave periods range from 10 minutes to 2 hours. After the tsunami initially reaches the optical fiber cable 10, a sufficient measurement period can detect non-wind generated energy. With periods longer than 300 seconds, tsunami energy will take the form of a "ramp" that continues to span the temporal period until its duration approaches a quarter period. Such energy is normally removed by de-trending, but is the signal of interest in this application. A ramp having a quarter period this long in duration is a strong indicator of a tsunami.

A further supplemental confirmation of detection comprises an additional tenth step 75 of performing a k-$\omega$ detection confirmation and communicating the confirmation. The k-$\omega$ filter discriminates against energy based on propagation speed. Once again, a process of elimination identifies wave-generated energy having speeds between 5 to 60 miles per hour. When the remaining energy exceeds a predetermined threshold that is an indication of a tsunami wave detection.

The advantage of the present invention is that it provides real time detection of a tsunami wave with reasonable accuracy in as little as five minutes while also reducing the occurrence of false detections.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method of tsunami wave detection comprising the steps of:
   disposing an optical fiber cable across the ocean;
   broadcasting an optical signal with a laser across the optical fiber cable;
   repeating said optical signal through the use of a plurality of optical repeaters disposed a predetermined distance from each other within said optical fiber cable, wherein said plurality of optical repeaters overcome losses in the optical signal due to attenuation;
   receiving a plurality of signal data from the optical fiber cable with a digital signal processor joined to said optical fiber cable, wherein the signal data represents measurements of pressure on the optical fiber cable from water waves and is measured using optical time delay reflectometry;
   sorting the measurements of pressure on the optical fiber cable as a function of distance along the optical fiber cable;
   performing a spatial fast Fourier transform on the signal data through the use of said digital signal processor joined to said optical fiber cable;
   plotting the results of the spatial fast Fourier transform on the signal data as a wave number bin versus power;

analyzing the wave-number bin versus power plot to determine if there is significant energy in low wavenumber bins, wherein significant energy in these bins is a strong indication of a tsunami wave;

performing a low pass filter on the results of the spatial fast Fourier transform to filter out noise and any non-tsunami wave energy; and analyzing the filtered results to determine if the wave number bins have crossed a threshold energy level that represents a detection and then communicating said detection.

2. The method of claim 1 further comprising the steps of:

employing frequency detection to detect non wind generated energy, wherein in periods longer than 300 seconds, tsunami energy will take the form of a "ramp" that continues to span the temporal period until its duration approaches a quarter wavelength disposing an optical fiber cable across the ocean; and analyzing said ramp to confirm tsunami presence and communicating the confirmation.

3. The method of claim 2 further comprising the steps of:

employing a supplemental confirmation of detection through k-ω detection and communicating the confirmation, wherein the k-ω filter discriminates against energy based on propagation speed, and a process of elimination identifies wave-generated energy having speeds between 5 to 60 miles per hour, such that when the remaining energy exceeds a predetermined threshold that is an indication of a tsunami wave detection which is then communicated.

* * * * *